(12) United States Patent
Ahn et al.

(10) Patent No.: US 8,343,647 B2
(45) Date of Patent: Jan. 1, 2013

(54) BATTERY PACK COMPRISING COMBINED TEMPERATURE-CONTROLLING SYSTEM

(75) Inventors: Jaesung Ahn, Busan (KR); Do Yang Jung, Gyeonggi-do (KR); John E. Namgoong, Daejeon (KR); Seungdon Choi, Daejeon (KR); Sinyoung Park, Daejeon (KR)

(73) Assignee: LG Chem, Ltd. (KR)

( * ) Notice: Subject to any disclaimer, the term of this patent is extended or adjusted under 35 U.S.C. 154(b) by 402 days.

(21) Appl. No.: 12/225,983

(22) PCT Filed: Mar. 31, 2007

(86) PCT No.: PCT/KR2007/001588
§ 371 (c)(1),
(2), (4) Date: Apr. 14, 2009

(87) PCT Pub. No.: WO2007/114615
PCT Pub. Date: Oct. 11, 2007

(65) Prior Publication Data
US 2009/0305124 A1    Dec. 10, 2009

(30) Foreign Application Priority Data
Apr. 3, 2006    (KR) .......................... 10-2006-0029964

(51) Int. Cl.
*H01M 10/50*    (2006.01)
(52) U.S. Cl. ........................................ 429/120; 429/152
(58) Field of Classification Search .................. 429/152, 429/120
See application file for complete search history.

(56) References Cited

U.S. PATENT DOCUMENTS
6,468,689 B1    10/2002    Hallaj et al.
(Continued)

FOREIGN PATENT DOCUMENTS
DE    19503085 A1    9/1996
EP    1207581 A1    5/2002
KR    20010037119 A    5/2001

OTHER PUBLICATIONS

Pesaran, Battery Thermal Management in EVs and HEVs: Issues and Solutions, Feb. 2001. p. 1-10.*

(Continued)

*Primary Examiner* — Ula C Ruddock
*Assistant Examiner* — Frank Chernow
(74) *Attorney, Agent, or Firm* — Lerner, David, Littenberg, Krumholz & Mentlik, LLP (57) ABSTRACT

Disclosed herein is a middle- or large-sized battery pack including a plurality of unit cells electrically connected with each other, wherein the battery pack is constructed in a structure in which a heat transfer medium flows through gaps defined between the unit cells for controlling the overall temperature of the battery pack to be within a predetermined temperature range for the optimum operation of the battery pack, and each unit cell is provided at the outer surface thereof, at which the heat transfer medium is brought into contact with each unit cell, with a layer containing a phase transformation material ('phase transformation layer') for minimizing individual temperature difference between the unit cells. The present invention has the effect of controlling the overall temperature of the battery pack and individual controlling the temperatures of unit cells constituting the battery pack. Also, the present invention has the effect of restraining the abrupt change in temperature of the unit cells, when the battery pack is not in operation or when the external environment abruptly changes, thereby preventing the degradation of the unit cells. Furthermore, the present invention has the effect of minimizing damage to the unit cells due to foreign matter when the foreign matter is brought into contact with the unit cells. In addition, the present invention has the effect of reducing the overall temperature difference of the battery pack and manufacturing a middle- or large-sized battery pack having a compact structure.

12 Claims, 5 Drawing Sheets

U.S. PATENT DOCUMENTS

| | | |
|---|---|---|
| 6,797,427 B2 | 9/2004 | Maleki et al. |
| 6,942,944 B2 | 9/2005 | Al-Hallaj et al. |
| 2003/0054230 A1* | 3/2003 | Al-Hallaj et al. ............. 429/120 |
| 2005/0123828 A1* | 6/2005 | Oogami et al. ............... 429/152 |
| 2005/0202310 A1* | 9/2005 | Yahnker et al. ................ 429/62 |
| 2006/0063066 A1 | 3/2006 | Choi et al. |
| 2006/0090492 A1* | 5/2006 | Ahn et al. .................... 62/259.2 |

OTHER PUBLICATIONS

Xiao et al., Thermal Performance of a high conductive shape-stabilized thermal storage material, Elsevier, Feb. 2001, p. 293-296.*

* cited by examiner

BATTERY PACK COMPRISING COMBINED TEMPERATURE-CONTROLLING SYSTEM

CROSS REFERENCE TO RELATED APPLICATIONS

The present application is a national phase entry under 35 U.S.C. §371 of International Application No. PCT/KR2007/001588, filed Mar. 31, 2007, published in English, which claims priority from Korean Patent Application No. 10-2006-0029964, filed Apr. 3, 2006. The disclosures of said applications are incorporated by reference herein.

FIELD OF THE INVENTION

The present invention relates to a middle- or large-sized battery pack including a dual temperature-controlling system, and, more particularly, to a middle- or large-sized battery pack including a dual temperature-controlling system that is capable of controlling the overall temperature of the battery pack using a heat transfer medium flowing through gaps defined between unit cells of the battery pack and controlling the temperature of each unit cell using a phase transformation layer attached to the outer surface of each unit cell.

BACKGROUND OF THE INVENTION

One of the biggest problems caused from vehicles using fossil fuel, such as gasoline and diesel oil, is creation of air pollution. A technology for using a secondary battery, which can be charged and discharged, as a power source for vehicles has attracted considerable attention as one method of solving the above-mentioned problem. As a result, electric vehicles (EV), which are operated using only a battery, and hybrid electric vehicles (HEV), which jointly use a battery and a conventional engine, have been developed. Some of the electric vehicles and the hybrid electric vehicles are now being commercially used. A nickel-metal hydride (Ni-MH) secondary battery has been mainly used as the power source for the electric vehicles (EV) and the hybrid electric vehicles (HEV). In recent years, however, the use of a lithium-ion secondary battery has also been attempted.

High output and large capacity are needed for such a secondary battery to be used as the power source for the electric vehicles (EV) and the hybrid electric vehicles (HEV). To this end, a plurality of small-sized secondary batteries (unit cells) are connected in series and/or in parallel with each other so as to constitute a battery module, and a plurality of battery modules are connected in parallel and/or in series with each other so as to constitute a middle- or large-sized battery pack.

In such a high-output, large-capacity battery pack, however, a large amount of heat is generated from the unit cells during the charge and discharge of the unit cells. When the heat generated from the unit cells during the charge and discharge of the unit cells is not effectively removed, heat is accumulated in the unit cells with the result that the unit cells are degraded. Furthermore, when some of the unit cells are overheated due to various causes during the accumulation of heat in the unit cells, there is a high possibility that the unit cells catch fire or explode. Consequently, it is necessary to provide a cooling system for cooling a middle- or large-sized battery pack having high output and large capacity.

Generally, the cooling of the middle- or large-sized battery pack is accomplished by the flow of a coolant. For example, there is being used a coolant-flow cooling system constructed in a structure in which a coolant, such as air, forcibly flows between unit cells or battery modules of the battery pack by the operation of a cooling fan. However, this coolant-flow cooling system has several problems.

First, the conventional cooling system has a problem in that the temperature difference between the unit cells is very large. When the battery pack includes a plurality of unit cells, and the unit cells are maintained in optimum operation, the battery pack is also maintained in optimum operation. Consequently, the large temperature difference between the unit cells accelerates the degradation of the unit cells and restrains the optimum operation of the battery pack.

Figure 1:
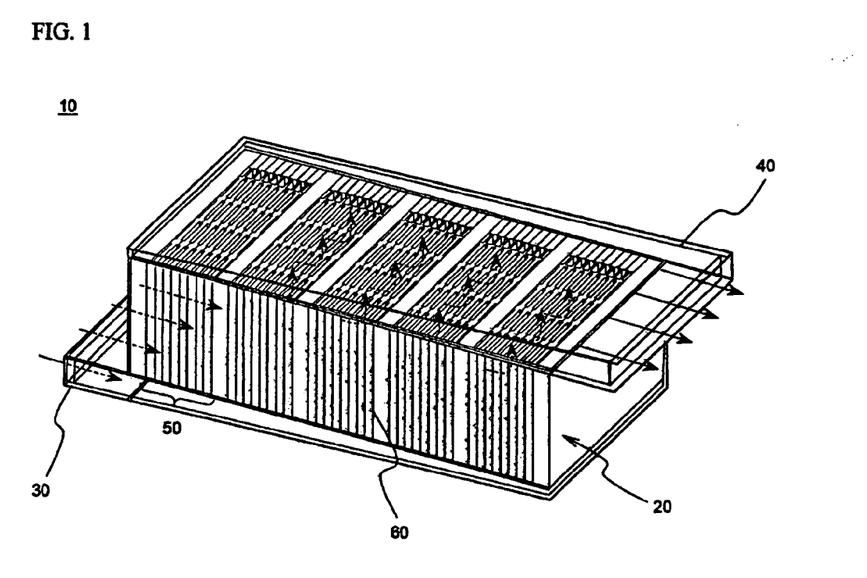
FIG. 1 is a see-through view typically illustrating a conventional battery pack cooling system.

Second, the conventional cooling system increases the size of the battery pack. For example, since the size of a battery pack that can be mounted in electric vehicles (EV) and hybrid electric vehicles (HEV) is restricted, the large-sized battery pack is difficult to be mounted in the electric vehicles (EV) and the hybrid electric vehicles (HEV). FIG. 1 is a typical view illustrating a conventional representative battery pack cooling system.

The battery pack cooling system 10 includes a battery pack 20 comprising a plurality of batteries, a coolant inlet port 30 mounted at the top of the battery pack 20, and a coolant outlet port 40 mounted at the bottom of the battery pack 20. The battery pack 20 comprises a plurality of battery groups 50 electrically connected with each other. Each battery group 50 comprises a plurality of unit cells 60 electrically connected with each other. Between the respective unit cells 60 of each battery group 50 are formed small gaps, through which a coolant flows. Consequently, a coolant introduced through the coolant inlet port 30 flows through the gaps defined between the respective unit cells 60 of each battery group 50 so as to remove heat generated from the respective unit cells 60, and is then discharged through the coolant outlet port 40 mounted at the top of the battery pack 20.

In the above-described structure, the coolant inlet port 30 and the coolant outlet port 40 are mounted at the top and bottom of the battery pack 20, respectively. Consequently, it is required that spaces necessary to mount such coolant guide members be provided at the top and bottom of the battery pack 20. This is a principal factor increasing the total size of the battery pack 20.

In addition, vehicles, such as electric vehicles (EV) and hybrid electric vehicles (HEV), may be frequently operated under tough conditions. The optimum operating condition of each unit cell constituting the battery pack may be changed depending upon various factors. Generally, the optimum operating condition of each unit cell is decided within a specific temperature range. On the other hand, the vehicles are operated at low temperature in the winter season. Consequently, it is required that the battery pack be controlled to be within the above-mentioned optimum operating temperature range. In this case, it is necessary to stop the operation of the cooling system such that the battery pack can be operated within the optimum operating temperature range. Alternatively, it may be necessary to increase the temperature of a coolant (e.g., air) introduced into the cooling system such that the operating temperature of the battery pack can be controlled to be within the optimum operating temperature range. However, when the unit cells of the battery pack have low temperature, battery components may be damaged. Furthermore, the degradation of the battery components may be accelerated due to the abrupt increase of the temperature of the coolant introduced into the cooling system.

Meanwhile, when, in spite of removal of foreign matter by filtering the coolant, some of the foreign matter is introduced into the battery pack, and is brought into contact with the unit cells of the battery pack, another problem may be caused. Generally, the unit cells constituting the battery pack are wrapped with prismatic containers or pouch-shaped laminate sheets. The outer surfaces of the unit cells may be physically or chemically damaged depending upon kinds of foreign matter. Such damage to the unit cells, in which electrochemical reactions occur, causes combustion or explosion of the unit cells.

Consequently, there is high necessity for a technology of fundamentally solving the above-mentioned problems.

SUMMARY OF THE INVENTION

Therefore, the present invention has been made to solve the above-mentioned problems, and other technical problems that have yet to be resolved.

Specifically, it is a first object of the present invention to provide a middle- or large-sized battery pack that is capable of controlling the overall temperature of the battery pack and individually controlling the temperatures of unit cells constituting the battery pack.

It is a second object of the present invention to provide a middle- or large-sized battery pack that is capable of restraining the abrupt change in temperature of the unit cells, when the battery pack is not in operation or when the external environment abruptly changes, thereby preventing the degradation of the unit-cells.

It is a third object of the present invention to provide a middle- or large-sized battery pack that is capable of minimizing damage to the unit cells due to foreign matter when the foreign matter is brought into contact with the unit cells.

It is a fourth object of the present invention to provide a middle- or large-sized battery pack including a temperature-controlling system for reducing the overall temperature difference of the battery pack.

It is a fifth object of the present invention to provide a middle- or large-sized battery pack having a minimized size while accomplishing the above-mentioned objects.

In accordance with the present invention, the above and other objects can be accomplished by the provision of a middle- or large-sized battery pack including a plurality of unit cells electrically connected with each other, wherein the battery pack is constructed in a structure in which a heat transfer medium flows through gaps defined between the unit cells for controlling the overall temperature of the battery pack to be within a predetermined temperature range for the optimum operation of the battery pack, and each unit cell is provided at the outer surface thereof, at which the heat transfer medium is brought into contact with each unit cell, with a layer containing a phase transformation material ('phase transformation layer') for minimizing individual temperature differences between the unit cells.

In the battery pack according to the present invention, therefore, the overall temperature of the battery pack is controlled by the heat transfer medium flowing through the gaps between the unit cells, and the temperature of each unit cell is controlled by the phase transformation layer attached to the outer surface of each unit cell. Specifically, heat generated from each unit cell during the operation of the battery pack is transmitted to the phase transformation layer attached to the outer surface of each unit cell with the result that each unit cell is primarily cooled. The phase transformation layer is secondarily cooled by the heat transfer medium flowing through the gaps between the unit cells. Also, when the external temperature abruptly decreases while the battery pack is not in operation, each unit cell is maintained at a predetermined temperature by virtue of heat stored in the phase transformation layer. Furthermore, the phase transformation layer serves to protect each unit cell from foreign matter introduced into the battery pack along with the heat transfer medium.

The phase transformation layer may be constructed in the form of a thin film directly applied to the outer surface of each unit cell or a film attached to the outer surface of each unit cell.

The phase transformation material contained in the phase transformation layer is a material of which the phase transformation, preferably from the solid phase to the liquid phase or from the liquid phase to the solid phase, occurs at the predetermined temperature. Specifically, the phase transformation material is a material having a large amount of latent heat during such phase transformation. The phase transformation material may be a single compound, a mixture, or a composite. The phase transformation includes a physical phase transformation of these materials occurring at the predetermined temperature and a phase transformation accomplished by the reversible physical or chemical reaction of a mixture of two or more materials at the predetermined temperature.

Representative examples of the phase transformation material may include parrafin, polyethylene glycol, inorganic hydrate (for example, $Na_2HPO_4.12H_2O$, $Na_2SO_4.10H_2O$, $Zn(NO_3)_2.6H_2O$). However, the phase transformation material is not limited to the above-specified materials. Preferably, the phase transformation material is paraffin, which has relatively high latent heat and is inexpensive and of which the phase transformation temperature is easily controlled depending upon the molecular weight thereof.

Also, the phase transformation layer may further contain a material having a high thermal conductivity to increase the thermal conduction of the phase transformation material. For example, the high thermal conductive material includes powdered metal or graphite. However, the high thermal conductive material is not limited to the above-specified materials.

The thickness of the phase transformation layer is not particularly restricted. Preferably, the thickness of the phase transformation layer is decided such that the phase transformation layer contains phase transformation heat capacity sufficient to maintain the unit cells at a predetermined temperature level while the thermal conductivity to the heat transfer medium is not greatly lowered during the discharge of the unit cells.

Preferably, the phase transformation material has a phase transformation temperature approximate to the upper limit of the optimum operating temperature range of each unit cell. The optimum operating temperature range of each unit cell may be changed depending upon the kinds of unit cells used. In a preferred embodiment, the optimum operating temperature range is 25 to 40 degrees Celsius. When the phase transformation temperature exceeds the above-specified temperature range, and, at the same time, is approximate to the above-specified temperature range, each unit cell can be maintained at least below the phase transformation temperature. Especially, when the temperature of some unit cells is relatively high, the phase transformation material restrains the increase in temperature of the unit cells, thereby securing the safety of the battery pack. Consequently, the phase transformation material minimizes the temperature difference between the unit cells.

When the heat transfer medium serves to lower the temperature of the battery pack, the heat transfer medium may be referred to as a coolant. The heat transfer medium is not particularly restricted so long as the heat transfer medium is a fluid that can flow through the gaps between the unit cells. Preferably, the heat transfer medium is air or water. More preferably, the heat transfer medium is air. A drive force necessary to forcibly move the heat transfer medium may be supplied from an additional drive unit, for example, a fan.

A plurality of unit cells are needed to manufacture a high-output, large-capacity battery pack. It is required that the unit cells be stacked with high integration to manufacture a compact battery pack. At the same time, it is required that the unit cells be spaced a predetermined distance from each other to control the temperature of the battery pack, and the heat transfer medium flow through the gaps between the unit cells.

In a preferred embodiment, therefore, the battery pack is constructed in a structure in which the unit cells are stacked one on another while the unit cells are spaced a predetermined distance from each other to form a plurality of battery groups, and the battery groups are arranged in lateral direction, and the outer surfaces of the battery groups are surrounded by a pack case. In this structure, the heat transfer medium is introduced through an introduction unit located at one side of the battery pack, flows through the gaps between the unit cells, and is then discharged through a discharge unit located at the other side of the battery pack.

In the above-described structure, the stacking of the unit cells and the lateral arrangement of the battery groups may be accomplished in various manners. In a preferred embodiment, the unit cells are mounted in each upper and lower open-type cartridge while the unit cells are arranged in the lateral direction, and the cartridges are stacked one on another to construct the battery pack. In this case, the cartridges are spaced a predetermined distance from each other, and the heat transfer medium flows through gaps defined between the cartridges to control the temperature of the unit cells.

Preferably, the battery pack is constructed in a structure in which an introduction unit, through which the heat transfer medium is introduced, and a discharge unit, through which the heat transfer medium is discharged, are located on the same plane of the battery pack, a flow channel defined between the introduction unit and the discharge unit (a flow channel for heat transfer medium) is divided into several flow channels such that the heat transfer medium introduced through the introduction unit flows through the respective battery groups and is then discharged through the discharge unit.

According to the structure of the battery pack constructed as described above, the introduction unit and the discharge unit are located on the same plane of the battery pack, whereby it is possible to minimize the total size of the battery pack. Also, one specific flow channel is assigned to each battery group, such that the cooling is individually performed for the respective battery groups. Consequently, the flow rate of the heat transfer medium in the respective flow channels is uniform, and therefore, the temperature difference between the unit cells is minimized.

The flow channels may be assigned to the respective battery groups in various manners. In a preferred embodiment, the introduction unit is provided with partition walls for isolating the respective battery groups from the neighboring battery groups such that the heat transfer medium flows through the respective battery groups during the circulation for cooling, and is then discharged. Preferably, the discharge part is provided with such partition walls.

The heat transfer medium guide member, which has the introduction unit and the discharge unit, may be mounted at the top or bottom of the battery pack. Alternatively, the heat transfer medium guide member may be mounted at one side of the battery pack. According to circumstances, the heat transfer medium guide member may be located at the middle of the battery pack, and the respective battery groups may be arranged at the top and bottom of the battery pack. Preferably, the heat transfer medium guide member is mounted at the top or bottom of the battery pack.

In a preferred embodiment, the introduction unit and the discharge unit are formed at the top of the battery pack, and the flow channel for heat transfer medium is constructed in a structure in which the heat transfer medium introduced through an inlet of the introduction unit moves toward one side of the battery pack, moves downward along a side wall (a) of the battery pack, moves to the other side of the battery pack through the gaps between the unit cells, moves upward along another side wall (b) of the battery pack, and is discharged through an outlet of the discharge unit.

As previously described, the battery pack is constructed in a structure in which a plurality of small-sized batteries (unit cells) are electrically connected with each other. The electrical connection means the connection of the battery groups and unit cells in series and/or parallel with each other to provide a battery having desired output and capacity, preferably high output and large capacity. The unit cells are not particularly restricted so long as the unit cells can be charged and discharged. For example, each unit cell is a secondary battery constructed in a structure in which cathodes, anodes, separators, and an electrolyte are mounted in a hermetically sealed container such that the secondary battery can be charged and discharged. The unit cells preferably usable in the battery pack according to the present invention may include a lithium ion secondary battery, a lithium ion polymer secondary battery, and a nickel-metal hydride secondary battery.

The battery pack is used preferably as a power source for electric vehicles or hybrid electric vehicles, more preferably as a power source for hybrid electric vehicles.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 2:
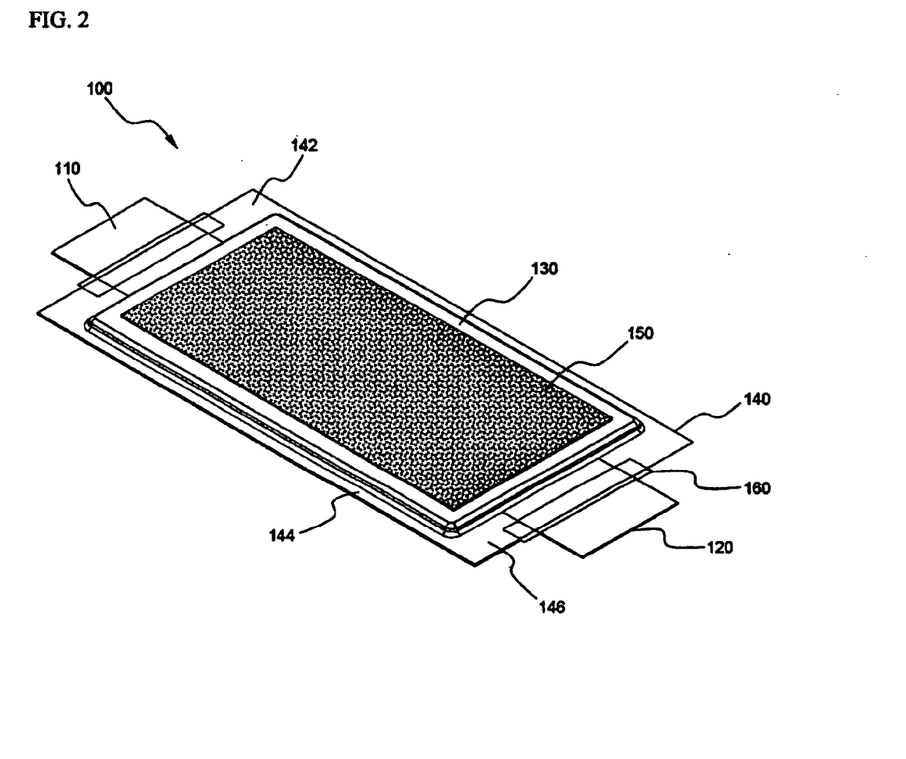
FIG. 2 is a typical view illustrating a preferred embodiment of unit cell that can be used in a battery pack according to the present invention.

FIG. 2 is a perspective view typically illustrating a pouch-shaped battery used as a unit cell according to a preferred embodiment of the present invention.

The pouch-shaped battery 100 is constructed in a structure in which two electrode taps 110 and 120 protrude from the upper end and the lower end of a battery body 130, respectively, while the electrode taps 110 and 120 are opposite to each other. According to circumstances, both the electrode taps 110 and 120 may protrude from the upper end of the battery body 130. A sheathing member 140, as a battery case, comprises upper and lower sheathing parts. That is, the sheathing member 140 is a two-unit member. While an electrode assembly (not shown) is received between the upper and lower sheathing parts of the sheathing member 140, opposite sides 142, an upper end 144, and a lower end 146, which are contact regions of the upper and lower sheathing parts of the sheathing member 140, are bonded to each other, whereby the pouch-shaped battery 100 is manufactured. The sheathing member 140 may be a one-unit member integrally connected at the lower end thereof. The sheathing member 140 is constructed in a laminate structure of a resin layer/a metal film layer/a resin layer. Consequently, it is possible to bond the opposite sides 142, the upper end 144, and the lower end 146 of the upper and lower sheathing parts of the sheathing member 140, which are in contact with each other, to each other by applying heat and pressure to the opposite sides 142, the upper end 144, and the lower end 146 of the upper and lower sheathing parts of the sheathing member 140 so as to weld the resin layers to each other. According to circumstances, the opposite sides 142, the upper end 144, and the lower end 146 of the upper and lower sheathing parts of the sheathing member 140 may be bonded to each other using a bonding agent. For the opposite sides 140 of the sheathing member 140, the same resin layers of the upper and lower sheathing parts of the sheathing member 140 are in direct contact with each other, whereby uniform sealing at the opposite sides 142 of the sheathing member 140 is accomplished by welding. For the upper and lower ends 144 and 146 of the sheathing member 140, on the other hand, the electrode taps 110 and 120 protrude from the upper and lower ends 144 and 146 of the sheathing member 140. For this reason, the upper and lower ends 144 and 146 of the upper and lower sheathing parts of the sheathing member 140 are thermally welded to each other, while a film-shaped sealing member 160 is interposed between the electrode taps 110 and 120 and the sheathing member 140, in consideration of the thickness of the electrode taps 110 and 120 and the difference in material between the electrode taps 110 and 120 and the sheathing member 140, so as to increase sealability.

To the top and/or bottom of the sheathing member 140 is attached a phase transformation layer 150 containing a phase transformation material. The function of the phase transformation layer 150 was previously described. The phase transformation layer 150 may be applied entirely to the top and/or bottom of the sheathing member 140. Alternatively, the phase transformation layer 150 may be applied partially to the top and/or bottom of the sheathing member 140 such that some of the sheathing member 140 is exposed.

Figure 3:
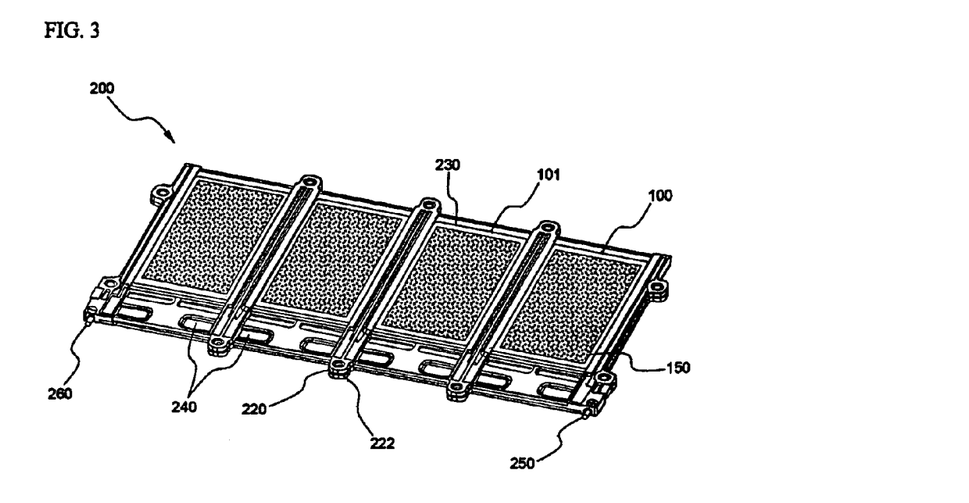
FIG. 3 is a typical view illustrating a preferred embodiment of battery cartridge that is used to construct a battery pack according to the present invention.

The battery 100 is preferably mounted in a cartridge as shown in FIG. 3 so as to construct a battery pack. FIG. 3 is a typical view illustrating an exemplary structure of a cartridge in which four unit cells are mounted.

Referring to FIG. 3, the cartridge 200 comprises a pair of frame members 220 and 222, which can be coupled with each other. Unit cells 100 and 101, to the outer surfaces of which a phase transformation layer 150 is attached, are located in cell partition walls 230 of the frame members 220 and 222 while the frame members 220 and 222 are separated from each other, and are then securely fixed at the cell partition walls 230 of the frame members 220 and 222 after the frame members 220 and 222 are coupled with each other. The unit cell 100 has an electrode tap (not shown), which is electrically connected to that of the neighboring unit cell 101 via a bus bar 240 located at the upper part of the cartridge 200. As can be seen from FIG. 3, the unit cells 100 and 101 are connected in series with each other. According to circumstances, however, the unit cells 100 and 101 may be connected in parallel with each other. The unit cells 100 and 101 are electrically connected to a cathode terminal 250 and an anode terminal 260, which protrude from opposite sides of the upper end of the cartridge 200, respectively.

Figure 4:
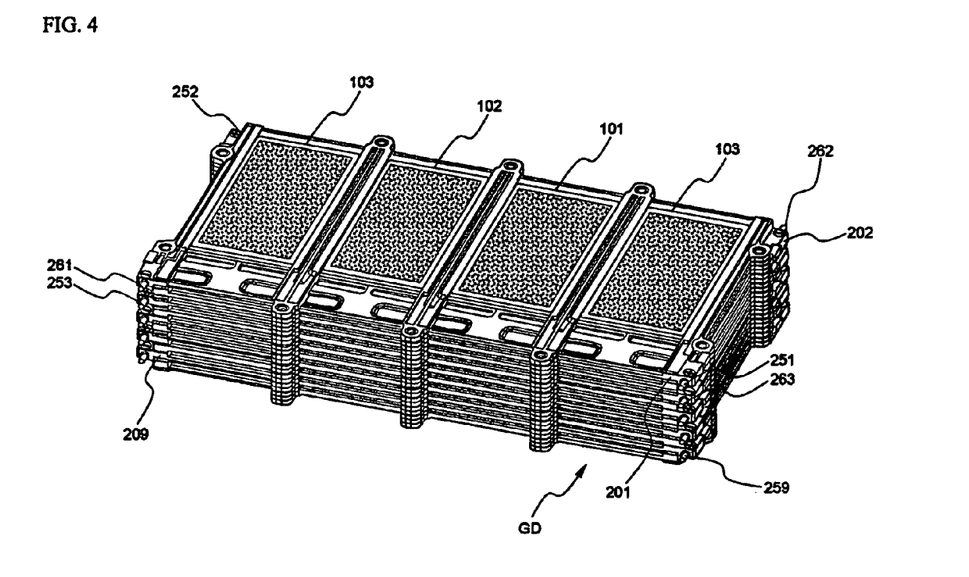
FIG. 4 is a typical view illustrating a structure in which a plurality of battery cartridges, one of which is illustrated in FIG. 3, are stacked to construct a battery pack according to the present invention.

FIG. 4 is a perspective view illustrating a structure in which a plurality of battery cartridges, one of which is illustrated in FIG. 3, are stacked in a specific manner to construct a middle- or large-sized battery pack.

Referring to FIG. 4, ten cartridges are stacked one on another in an alternate 180-degree orientation manner such that the cartridges are effectively connected in series with each other. Specifically, electrode terminals 251 and 261 of a first cartridge 201 and electrode terminals 252 and 262 of a second cartridge 202 are arranged in opposite orientations. On the other hand, electrode terminals 253 and 263 of a third cartridge 203 and the electrode terminals 251 and 261 of the first cartridge 201 are arranged in the same orientation. Also, electrode terminals 254 and 264 of a fourth cartridge 204 and the electrode terminals 252 and 262 of the second cartridge 202 are arranged in the same orientation. Such alternate orientations of the electrode terminals are the same for all the cartridges. Consequently, the electrode terminals of the odd-numbered cartridges 201, 203, 205 . . . , and the electrode terminals of the even-numbered cartridges 202, 204, 206 . . . are arranged in the alternate 180-degree orientation manner.

The anode terminal 261 of the first cartridge 201 is connected to a battery management system (BMS), which is not shown in the drawing. The cathode terminal 251 of the first cartridge 201 is connected to the anode terminal 263 of the third cartridge 203 via a bus bar (not shown). The cathode terminal 253 of the third cartridge 203 is connected to the anode terminal 265 of the fifth cartridge 205. As a result, the connection length between the electrode terminals (for example, 251 and 263) is increased by the thickness of at least one cartridge. Consequently, the assembly operation is easily performed, and interference between the bus bars is minimized.

By stacking the cartridges 201, 202, 203 . . . as shown in FIG. 4, for example, a plurality of unit cells arranged vertically below the first unit cell 100 form a battery group GD. Similarly, other battery groups are formed with respect to the remaining unit cells 101, 102 . . . .

Figure 5:
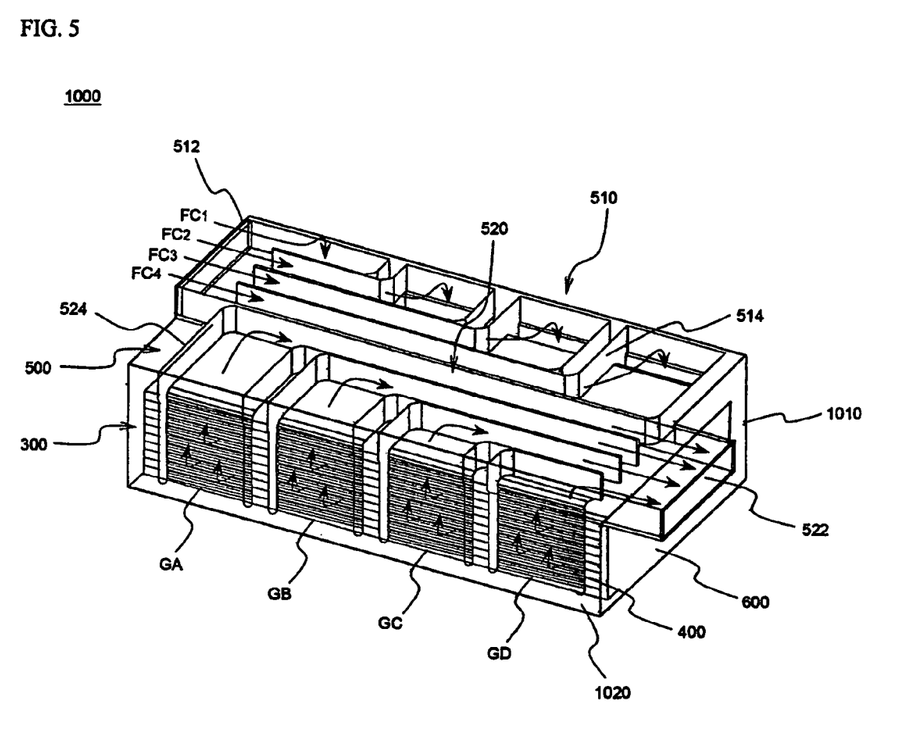
FIG. 5 is a typical view illustrating a middle- or large-sized battery pack according to a preferred embodiment of the present invention.

FIG. 5 is a see-through view typically illustrating the structure of a battery pack according to a preferred embodiment of the present invention.

Referring to FIG. 5, the battery pack 1000 includes a cartridge stack group 300 constructed in a structure as shown in FIG. 4 and a heat transfer medium guide member 500 mounted at the top of the cartridge stack group 300. The cartridge stack group 300 is divided into four battery groups GA, GB, GC, and GD depending upon the vertical arrangement structure of the unit cells 400.

The heat transfer medium guide member 500 is constructed in a structure in which an introduction unit 510, through which a heat transfer medium is introduced, and a discharge unit 520, through which the heat transfer medium is discharged, are located at the top of the cartridge stack group 300. The introduction unit 510 includes an inlet port 512, through which a heat transfer medium supplied from an additional heat transfer medium supply unit (not shown) is introduced into the hermetically sealed system, and partition walls 514 for dividing a flow channel into several flow channels along which the heat transfer medium flows to the respective battery groups GA, GB, GC, and GD. The discharge unit 520 includes partition walls 524 arranged such that the heat transfer medium (which has relatively high temperature) having flowed through the respective battery groups GA, GB, OC, and GD can flow along flow channels defined between the respective partition walls 524 and an outlet port 522, through which the heat transfer medium is discharged out of the battery pack 1000.

The outer surface of the battery pack 1000 is surrounded by a case 600 in a sealed state, excluding the inlet port 512 and the outlet port 522, such that the heat transfer medium can flow only along the flow channel without the dispersion of the heat transfer medium.

The heat transfer medium introduced through the inlet port 512 flows along the respective flow channels defined by the partition walls 514, and therefore, the flow rates of the heat transfer medium in the respective flow channels are the same. Specifically, the flow rate $FC_1$ of the heat transfer medium in the flow channel extending to the first battery group GA, the flow rate $FC_2$ of the heat transfer medium in the flow channel extending to the second battery group GB, the flow rate $FC_3$ of the heat transfer medium in a flow channel extending to the third battery group GC, and the flow rate $FC_4$ of the heat transfer medium in a flow channel extending to the fourth battery group GD are all the same. The partition walls 514 of the introduction unit 510 extend downward to the bottom of the battery pack 1000 along a first side wall 1010. Consequently, the heat transfer medium introduced through the inlet port 512 moves toward a second side wall 1020, which is opposite to the first side wall 1010, through the gaps defined between the unit cells 400 along the first side wall 1010. The respective battery groups GA, GB, GC, and GD are isolated from each other. Consequently, the heat transfer medium flowing through one of the battery groups (e.g., GA) cannot pass through another battery groups (e.g., GB) during the movement of the heat transfer medium from the first side wall 1010 to the second side wall 1020. Through the above-described process, heat generated from the unit cells 400 is transmitted to the heat transfer medium.

The heat transfer medium having flowed to the second side wall 1020 moves upward to the discharge unit 520 along the flow channels divided by the partitions 524, and is then discharged through the outlet port 522. After heat transfer medium flows upward along the second side wall 120, the flow rate of the heat transfer medium passing through the unit cells is not changed. Consequently, it is possible to provide a structure in which the partition walls 524 are formed only at the second side wall 120 of the discharge unit 520.

Figure 6:
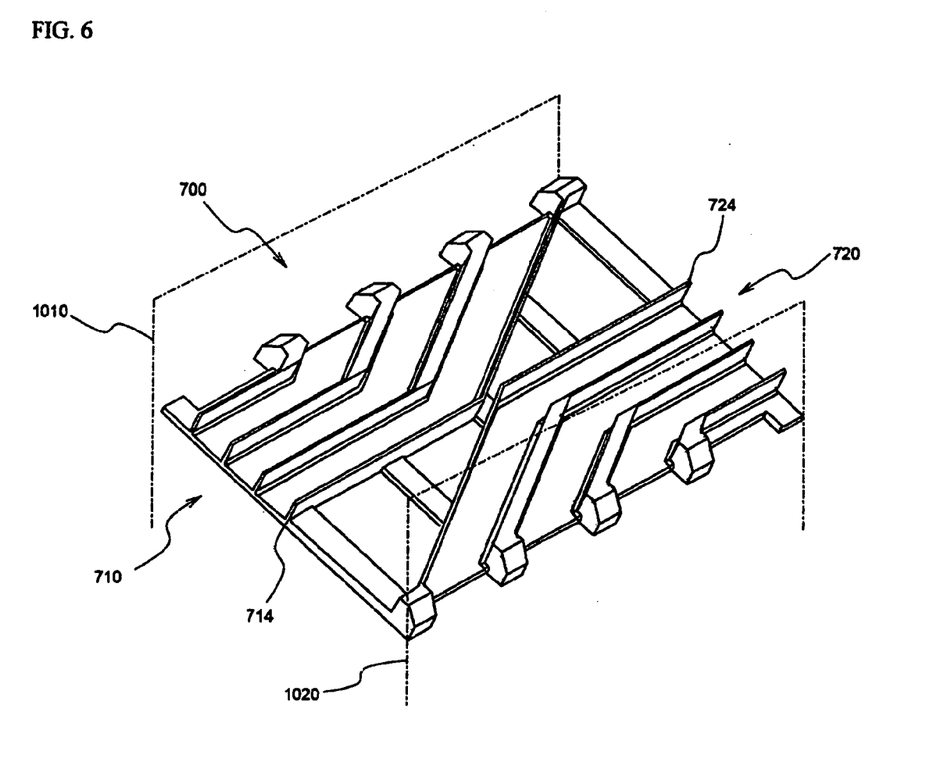
FIG. 6 is a perspective view illustrating a preferred embodiment of heat transfer medium guide member that can be used in a battery pack according to the present invention.

FIG. 6 is a perspective view illustrating the structure of a heat transfer medium guide member according to another preferred embodiment of the present invention.

The heat transfer medium guide member 700 of FIG. 6 is generally identical to the heat transfer medium guide member of FIG. 5 except the shapes of partition walls 714 of an introduction unit 710 and partition walls 724 of a discharge unit 720. Specifically, the partition walls 714 of the introduction unit 710 extend to an inlet port (not shown) of the introduction unit 710. The partition walls 714 are gently inclined toward a first side wall 1010. Also, the partition walls 724 of the discharge unit 720 extend to an outlet port (not shown) of the discharge unit 720. The partition walls 724 are gently inclined toward a second side wall 1020.

Consequently, the heat transfer medium guide member may be constructed in various structures so long as the principle of the present invention is realized by the heat transfer medium guide member. Various possible heat transfer medium guide members must be interpreted to be within the scope of the present invention.

Figure 7:
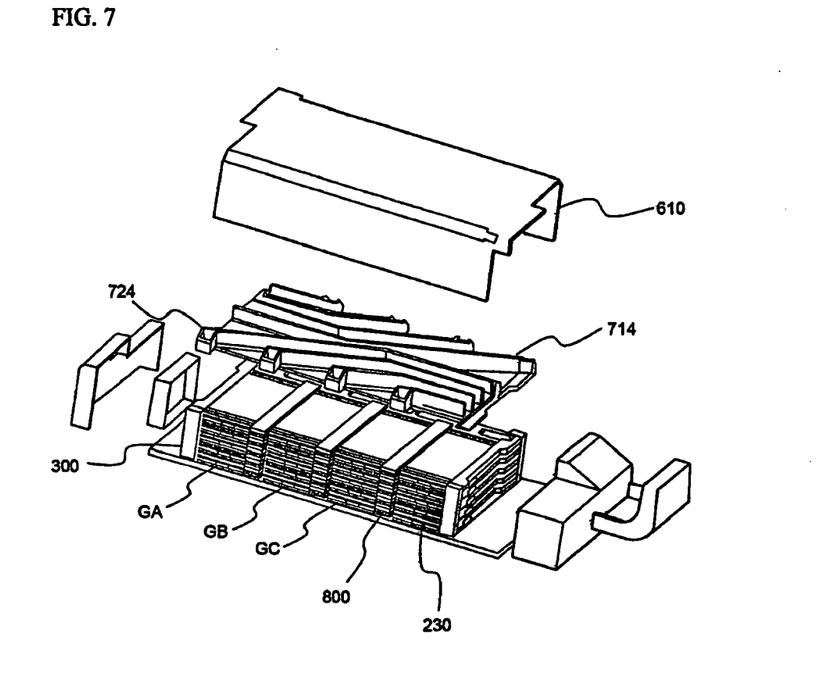
FIG. 7 is an exploded perspective view illustrating a process for constructing a battery pack according to a preferred embodiment of the present invention.
Figure 8:
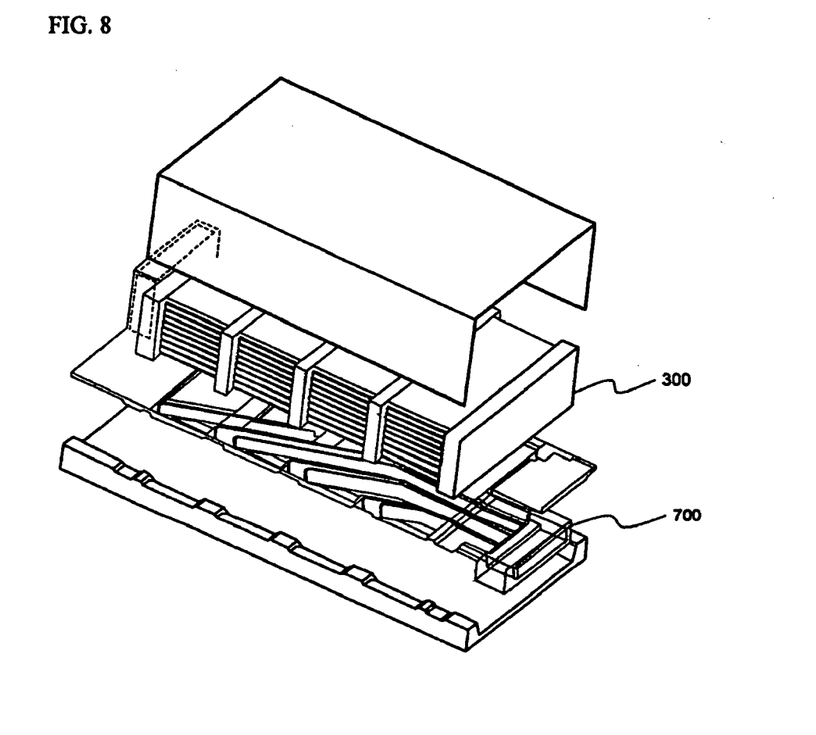
FIG. 8 is an exploded perspective view illustrating a process for constructing a battery pack according to another preferred embodiment of the present invention.

FIGS. 7 and 8 are views respectively illustrating the heat transfer medium guide member mounted at the top and bottom of the cartridge stack group so as to construct a battery pack.

Referring to FIG. 7, separating members 800 for isolating the battery groups GA, GB, GC, and GD from each other protrude toward the side of the cartridge stack group 300. The separating members 800 is in tight contact with a case cover 610. Consequently, the partition walls 714 and 724 do not extend to the side of the cartridge stack group 300.

Referring to FIG. 8, the heat transfer medium guide member 700 is mounted at the bottom of the cartridge stack group 300. Consequently, the heat transfer medium flow in the direction opposite to the flow direction of FIG. 5.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the present invention has the effect of controlling the overall temperature of the battery pack and individually controlling the temperatures of unit cells constituting the battery pack. Also, the present invention has the effect of restraining the abrupt change in temperature of the unit cells, when the battery pack is not in operation or when the external environment abruptly changes, thereby preventing the degradation of the unit cells. Furthermore, the present invention has the effect of minimizing damage to the unit cells due to foreign matter when the foreign matter is brought into contact with the unit cells. In addition, the present invention has the effect of reducing the overall temperature difference of the battery pack and manufacturing a middle- or large-sized battery pack having a compact structure.

What is claimed is:

1. A battery pack comprising a plurality of unit cells electrically connected with each other, wherein
the battery pack is constructed in a structure in which a heat transfer medium flows through gaps defined between the unit cells for controlling the overall temperature of the battery pack to be within a predetermined temperature range for the optimum operation of the battery pack;
each unit cell is provided at the outer surface thereof, at which the heat transfer medium is brought into contact with each unit cell, with a phase transformation layer for minimizing individual temperature difference between the unit cells;
wherein the battery pack is constructed in a structure in which the unit cells are stacked one on another while the unit cells are spaced a predetermined distance from each other to form a plurality of battery groups, and the battery groups are arranged in lateral direction, and the outer surfaces of the battery groups are surrounded by a pack case;

wherein the unit cells are mounted in a cartridge while the unit cells are arranged in the lateral direction, and the cartridges are stacked one on another to construct the battery pack;

wherein the cartridge comprises a pair of frame members, which can be coupled with each other, and the unit cells are located in cell partition walls of the frame members while the frame members are separated from each other, and are then securely fixed at the cell partition walls of the frame members after the frame members are coupled with each other; and the unit cell has an electrode tap, which is electrically connected to that of the neighboring unit cell via a bus bar located at the upper part of the cartridge.

2. The battery pack according to claim 1, wherein the phase transformation layer is constructed in the form of a thin film directly applied to the outer surface of each unit cell or a film attached to the outer surface of each unit cell.

3. The battery pack according to claim 1, wherein the phase transformation material is paraffin.

4. The battery pack according to claim 1, wherein the phase transformation layer further contains a material having a high thermal conductivity.

5. The battery pack according to claim 1, wherein the phase transformation material has a phase transformation temperature approximate to an upper limit of the optimum operating temperature range of each unit cell.

6. The battery pack according to claim 1, wherein the optimum operating temperature range is 25 to 40 degrees Celsius.

7. The battery pack according to claim 1, wherein the heat transfer medium is air.

8. The battery pack according to claim 1, wherein the battery pack is constructed in a structure in which an introduction unit, through which the heat transfer medium is introduced, and a discharge unit, through which the heat transfer medium is discharged, are located on the same plane of the battery pack, a flow channel defined between the introduction unit and the discharge unit (a flow channel for heat transfer medium) is divided into several flow channels such that the heat transfer medium introduced through the introduction unit flows through the respective battery groups and is then discharged through the discharge unit.

9. The battery pack according to claim 8, wherein the introduction unit is provided with partition walls for isolating the respective battery groups from the neighboring battery groups such that the heat transfer medium flows through the respective battery groups during the circulation for cooling, and is then discharged.

10. The battery pack according to claim 1, wherein the battery pack further includes a heat transfer medium guide member having an introduction unit and a discharge unit, the heat transfer medium guide member being mounted at the top or bottom of the battery pack.

11. The battery pack according to claim 10, wherein
the heat transfer medium guide member is mounted at the top of the battery pack, and
the flow channel for heat transfer medium is constructed in a structure in which the heat transfer medium introduced through an inlet of the introduction unit moves toward one side of the battery pack, moves downward along a side wall (a) of the battery pack, moves to the other side of the battery pack through the gaps between the unit cells, moves upward along another side wall (b) of the battery pack, and is discharged through an outlet of the discharge unit.

12. The battery pack according to claim 1, wherein the battery pack is used as a power source for electric vehicles or hybrid electric vehicles.

* * * * *